US009869540B1

(12) United States Patent
Su et al.

(10) Patent No.: US 9,869,540 B1
(45) Date of Patent: Jan. 16, 2018

(54) DISPLACEMENT MEASURING SYSTEM AND MACHINING SYSTEM COMPRISING THE SAME

(71) Applicant: NOPORVIS CO., LTD., Kaohsiung (TW)

(72) Inventors: Wei-Hung Su, Kaohsiung (TW); Hui-Hung Lin, Tainan (TW); Kuo-Kai Hung, Tainan (TW); Chun-Neng Chan, Kaohsiung (TW); Lu-Yu Wang, Tainan (TW)

(73) Assignee: NOPORVIS CO., LTD., Kaosiung (TW)

( * ) Notice: Subject to any disclaimer, the term of this patent is extended or adjusted under 35 U.S.C. 154(b) by 0 days.

(21) Appl. No.: 15/360,975

(22) Filed: Nov. 23, 2016

(30) Foreign Application Priority Data

Sep. 26, 2016 (TW) .............................. 105130945 A (51) Int. Cl.
*G01B 9/02* (2006.01)
*B23Q 17/00* (2006.01)

(52) U.S. Cl.
CPC ......... *G01B 9/02001* (2013.01); *B23Q 17/00* (2013.01); *G01B 9/02015* (2013.01); *G01B 9/02057* (2013.01); *G01B 2290/70* (2013.01)

(58) Field of Classification Search
CPC ............ G01B 9/02057; G01B 9/02015; G01B 2290/70; G01B 9/02001
See application file for complete search history.

(56) References Cited

U.S. PATENT DOCUMENTS

| 5,598,265 A * | 1/1997 | de Groot | G01B 11/306 356/512 |
| 8,072,610 B1 * | 12/2011 | Schmit | G01B 9/04 356/495 |
| 2010/0214570 A1 * | 8/2010 | Yeh | G01B 9/02055 356/511 |
| 2011/0032534 A1 * | 2/2011 | Malinovich | G01B 11/24 356/498 |
| 2012/0212718 A1 | 8/2012 | Den Boef | |

(Continued)

FOREIGN PATENT DOCUMENTS

| TW | 200925577 | | 6/2009 |
| TW | 201312292 A1 | | 3/2013 |
| TW | 201519980 A | | 6/2015 |

*Primary Examiner* — Shawn Decenzo
(74) *Attorney, Agent, or Firm* — Winston Hsu (57) ABSTRACT

A displacement measuring device includes an optical module for refracting or reflecting light; a beam splitting module including a polarizing beam splitting layer for allowing light with a first polarization direction to pass through and reflecting light with a second polarization direction; a light source for generating a first light beam with the first polarization direction and a second light beam with the second polarization direction, wherein the first light beam is reflected by a measured object after passing through the optical module and the beam splitting module, and the second light beam is reflected by the polarizing beam splitting layer after passing through the optical module; an image sensor for sensing an interference pattern generated by the reflected first and second light beams; and a processing unit for calculating a displacement value of the measured object according to the interference pattern.

17 Claims, 7 Drawing Sheets

(56) References Cited

U.S. PATENT DOCUMENTS

| | | | |
|---|---|---|---|
| 2013/0342902 A1* | 12/2013 | Krueger | G02B 21/242 359/383 |
| 2015/0204655 A1* | 7/2015 | Wang | G01B 11/0675 356/503 |
| 2015/0362309 A1* | 12/2015 | Quaedackers | G01B 11/2441 702/166 |
| 2016/0033257 A1* | 2/2016 | Meissner | G01B 9/02015 356/498 |
| 2016/0161245 A1 | 6/2016 | Fu | |
| 2016/0245758 A1* | 8/2016 | Liu | G01B 9/0203 |

* cited by examiner

DISPLACEMENT MEASURING SYSTEM AND MACHINING SYSTEM COMPRISING THE SAME

BACKGROUND OF THE INVENTION

1. Field of the Invention

The present invention relates to a displacement measuring device and a machining system, and more particularly, to a displacement measuring device and a machining system capable of improving machining precision.

2. Description of the Prior Art

As related technology keeps improving, requirements on machining quality and machining precision of a workpiece are getting higher. Generally, a machine tool utilizes a ball screw or other precision transmission mechanism to move a cutting tool or a workpiece for machining the workpiece precisely. However, resolution of the ball screw is at the micron level. The current machine tool can only perform micron level machining on the workpiece by controlling rotation of the ball screw. When the machine tool is required to perform sub-micron level or nano level machining on the workpiece, the machine tool needs to cooperate with a displacement measuring device with higher resolution to perform machining. However, the current high resolution displacement measuring device usually has a more complex structure and a larger size, such that the high resolution displacement measuring device of the prior art cannot be effectively integrated with the machine tool.

SUMMARY OF THE INVENTION

The present invention provides a displacement measuring device comprising a first optical module, a first beam splitting module, a light source, an image sensor and a processing unit. The first optical module is configured to refract or reflect light. The first beam splitting module comprises a first transparent plate having a first surface and a second surface, the first surface being configured to be arranged between the second surface and a first measuring surface of a measured object; a first polarizing beam splitting layer formed on the first surface for allowing light with a first polarization direction to pass through and reflecting light with a second polarization direction; and a first reflective layer partially formed on the second surface for reflecting light. The light source is configured to generate a first light beam with the first polarization direction and a second light beam with the second polarization direction, wherein after sequentially passing through a first side of the first optical module, the first transparent plate and the first polarizing beam splitting layer, the first light beam is reflected by the first measuring surface of the measured object in order to further sequentially pass through the first polarizing beam splitting layer, the first transparent plate and a second side of the first optical module; and after passing through the first side of the first optical module, the second light beam enters the first transparent plate and is sequentially reflected by the first polarizing beam splitting layer, the first reflective layer and the first polarizing beam splitting layer in order to further pass through the second side of the first optical module. The image sensor is configured to sense a first interference pattern generated by the first and second light beams passing through the second side of the first optical module. The processing unit is electrically connected to the image sensor for calculating a displacement value of the measured object relative to the displacement measuring device along a first predetermined direction according to the first interference pattern.

The present invention further provides a machining system comprising a base, a cutting tool, a holding platform and a displacement measuring device. The cutting tool is arranged on the base for machining a workpiece. The holding platform is movable relative to the base for holding the workpiece. The displacement measuring device comprises a first optical module, a first beam splitting module, a light source, an image sensor and a processing unit. The first optical module is configured to refract or reflect light. The first beam splitting module comprises a first transparent plate having a first surface and a second surface, the first surface being configured to be arranged between the second surface and a first measuring surface of the base; a first polarizing beam splitting layer formed on the first surface for allowing light with a first polarization direction to pass through and reflecting light with a second polarization direction; and a first reflective layer partially formed on the second surface for reflecting light. The light source is configured to generate a first light beam with the first polarization direction and a second light beam with the second polarization direction, wherein after sequentially passing through a first side of the first optical module, the first transparent plate and the first polarizing beam splitting layer, the first light beam is reflected by the first measuring surface of the base in order to further sequentially pass through the first polarizing beam splitting layer, the first transparent plate and a second side of the first optical module; and after passing through the first side of the first optical module, the second light beam enters the first transparent plate and is sequentially reflected by the first polarizing beam splitting layer, the first reflective layer and the first polarizing beam splitting layer in order to further pass through the second side of the first optical module. The image sensor is configured to sense a first interference pattern generated by the first and second light beams passing through the second side of the first optical module. The processing unit is electrically connected to the image sensor for calculating a displacement value of the holding platform relative to the base along a first predetermined direction according to the first interference pattern.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
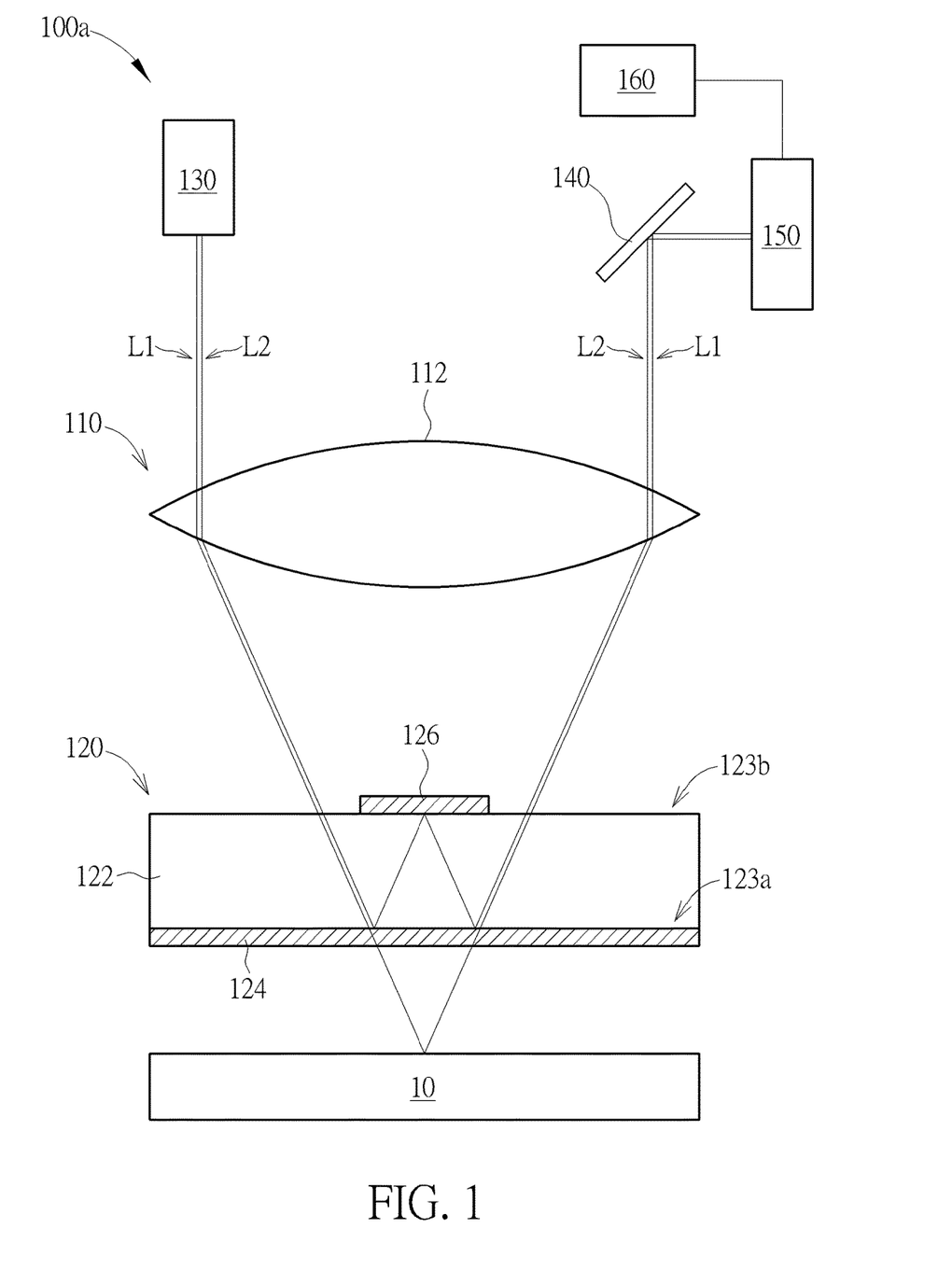
FIG. 1 is a diagram showing a first embodiment of a displacement measuring device of the present invention.

Please refer to FIG. 1. FIG. 1 is a diagram showing a first embodiment of a displacement measuring device of the present invention. As shown in FIG. 1, the displacement measuring device 100a of the present invention comprises an optical module 110, a beam splitting module 120, a light source 130, a reflective element 140, an image sensor 150 and a processing unit 160. The optical module 110 comprises a lens 112 for refracting light. The beam splitting module 120 comprises a transparent plate 122, a polarizing beam splitting layer 124 and a reflective layer 126. The transparent plate 122 has a first surface 123a and a second surface 123b. The second surface 123b is opposite to the first surface 123a. The first surface 123a is configured to be arranged between the second surface 123b and a measured object 10. The polarizing beam splitting layer 124 is formed on the first surface 123a for allowing light with a first polarization direction to pass through and reflecting light with a second polarization direction. The reflective layer 126 is partially formed on the second surface 123b for reflecting light. The reflective layer 126 can function similarly to the polarizing beam splitting layer 124 to allow the light with the first polarization direction to pass through and reflect the light with the second polarization direction, or the reflective layer 126 can reflect all visible light. The light source 130 is configured to generate a first light beam L1 with the first polarization direction and a second light beam L2 with the second polarization direction. The first light beam L1 and the second light beam L2 generated by the light source 130 have identical phase and wavelength. The light source 130 can be a laser light source, a white light source or other visible light sources. When the light source 130 simultaneously generates the first light beam L1 and the second light beam L2, the first light beam L1 is refracted to enter the transparent plate 122 after passing through a first side of the lens 112. When the first light beam L1 reaches the polarizing beam splitting layer 124, the polarizing beam splitting layer 124 allows the first light beam L1 with the first polarization direction to pass through. Thereafter, the first light beam L1 is reflected by a surface of the measured object 10 in order to further sequentially pass through the polarizing beam splitting layer 124, the transparent plate 122 and a second side of the lens 112. On the other hand, the second light beam L2 is refracted to enter the transparent plate 122 after passing through the first side of the lens 112. When the second light beam L2 reaches the polarizing beam splitting layer 124, the polarizing beam splitting layer 124 reflects the second light beam L2 with the second polarization direction. Thereafter, the second light beam L2 is sequentially reflected by the reflective layer 126 and the polarizing beam splitting layer 124 in the transparent plate 122 so as to further pass through the second side of the lens 112.

After the first light beam L1 and the second light beam L2 pass through the second side of the lens 112, the reflective element 140 reflects the first light beam L1 and the second light beam L2 passing through the second side of the lens 112 to the image sensor 150. After receiving the first light beam L1 and the second light beam L2, the image sensor 150 is configured to sense an interference pattern generated by the first light beam L1 and the second light beam L2. For example, the image sensor 150 can comprise a linear polarizing plate and an image sensing unit (such as a CCD or COMS sensing unit). The first light beam L1 and the second light beam L2 can be projected onto the linear polarizing plate after passing through the second side of the lens 112, in order to generate the interference pattern on the linear polarizing plate. The image sensing unit is then configured to sense the interference pattern generated on the linear polarizing plate. The processing unit 160 is electrically connected to the image sensor 150 and configured to calculate a displacement value of the measured object 10 according to the interference pattern sensed by the image sensor 150. For example, when a travelling distance of the first light beam L1 is equal to that of the second light beam L2, a brighter interference pattern is generated by the first light beam L1 and the second light beam L2 due to the identical phases of the first light beam L1 and the second light beam L2. When the travelling distance of the first light beam L1 differs from that of the second light beam L2 by a half of wavelength, a darker interference pattern is generated by the first light beam L1 and the second light beam L2 will generate due to opposite phases of the first light beam L1 and the second light beam L2. Therefore, the processing unit 160 can determine a light travelling distance difference between the first light beam L1 and the second light beam L2 according to brightness of the interference pattern. Since the travelling distance of the second light beam L2 is fixed, the processing unit 160 can calculate the travelling distance of the first light beam L1 according to the travelling distance of the second light beam L2 and the light travelling distance difference between the first light beam L1 and the second light beam L2. Thereafter, the processing unit 160 can further calculate a distance between the measured object 10 and the first surface 123a according to the travelling distance of the first light beam L1. In other words, when the measured object 10 is moved relative to the beam splitting module 120, the processing unit 160 can calculate a displacement value of the measured object 10 relative to the displacement measuring device 100a according to variations in brightness of the interference pattern.

According to the above arrangement, since the wavelength of light is several hundreds of nanometers, resolution of the displacement measuring device 100a of the present invention can achieve a sub-micron level or a nano level. In addition, the displacement measuring device 100a of the present invention only needs to utilize the optical module 110 and the beam splitting module 120 to generate the interference pattern according to the first light beam L1 and the second light beam L2. Therefore, the displacement measuring device 100a of the present invention can have a simpler structure and a smaller size. Furthermore, in the displacement measuring device 100a of the present invention, the first light beam L1 and the second light beam L2 are required to pass through fewer optical components, and the beam splitting module 120 splits the first light beam L1 and the second light beam L2 according to the polarization directions. Therefore, the displacement measuring device 100a of the present invention has less beam energy loss, such that the displacement measuring device 100a can obtain a more precise measuring result.

Figure 2:
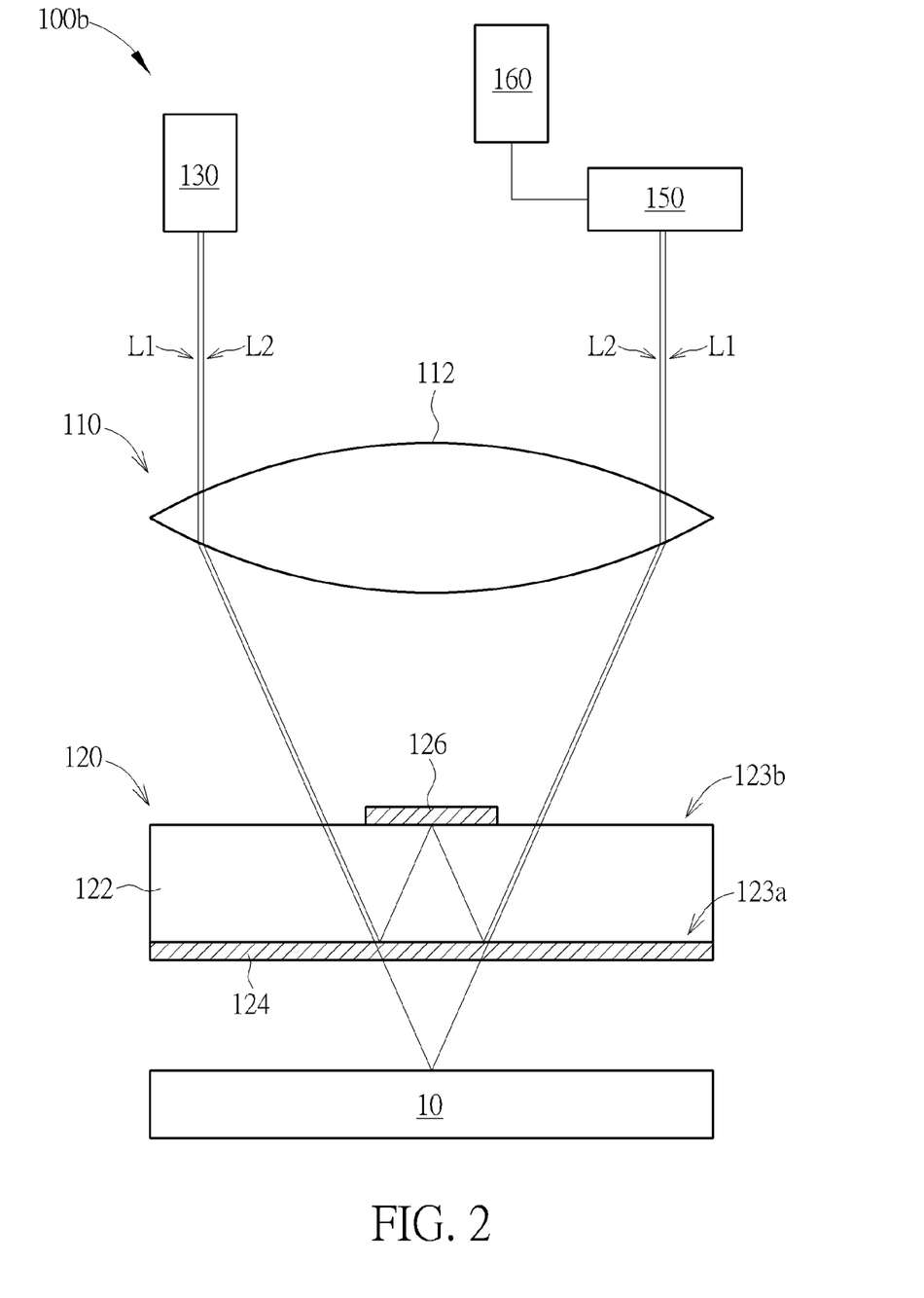
FIG. 2 is a diagram showing a second embodiment of the displacement measuring device of the present invention.

Please refer to FIG. 2. FIG. 2 is a diagram showing a second embodiment of the displacement measuring device of the present invention. Different from the first embodiment of the displacement measuring device 100a of the present invention, the reflective element is omitted in the second embodiment of the displacement measuring device 100b of the present invention. The image sensor can directly receive the first light beam L1 and the second light beam L2 passing through the second side of the lens 112. As such, the structure of the displacement measuring device 100b of the present invention can be further simplified and the size of the displacement measuring device 100b can be further reduced. Operation of the displacement measuring device 100b is similar to that of the displacement measuring device 100a. Therefore, no further illustration is provided.

Figure 3:
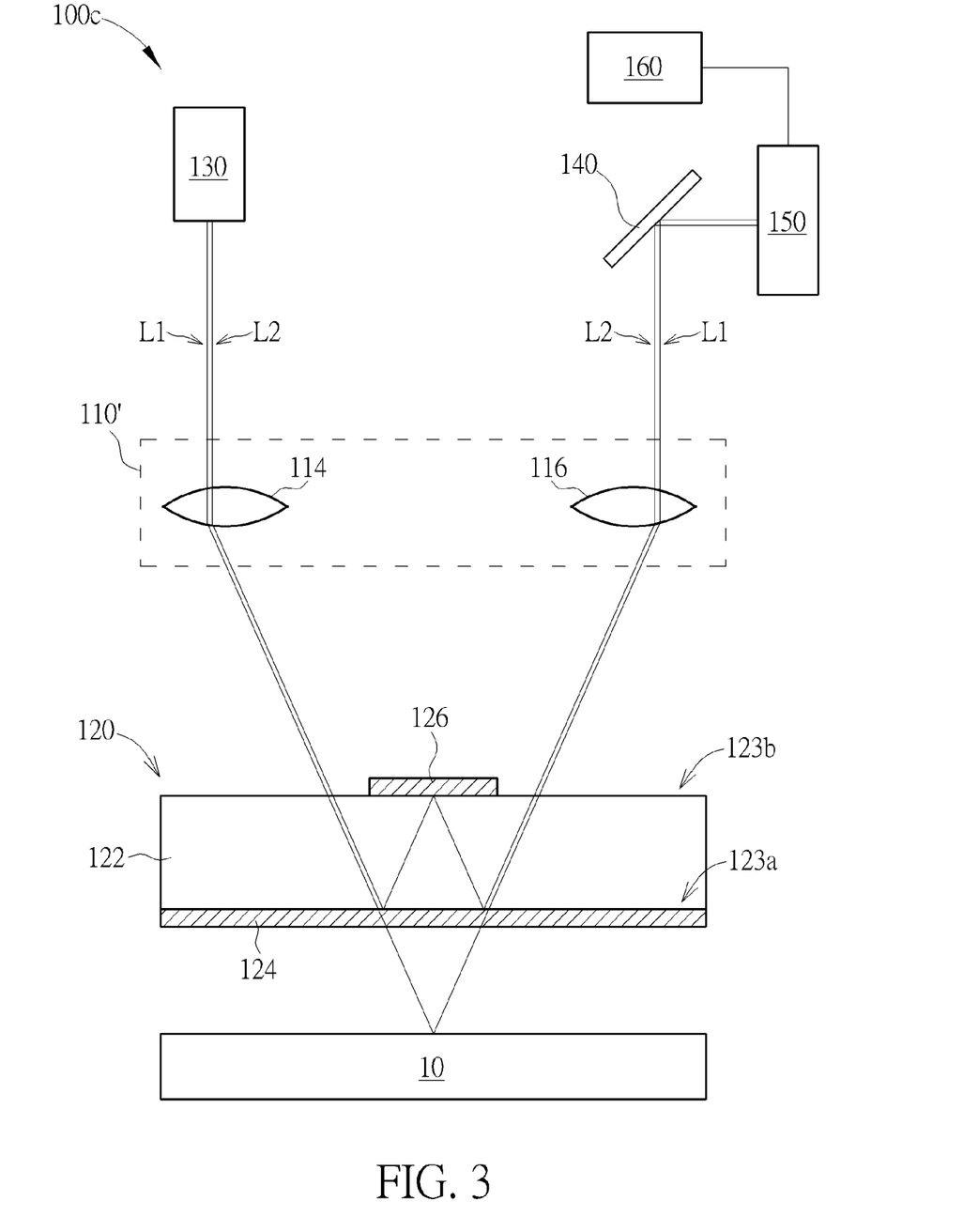
FIG. 3 is a diagram showing a third embodiment of the displacement measuring device of the present invention.

Please refer to FIG. 3. FIG. 3 is a diagram showing a third embodiment of the displacement measuring device of the present invention. As shown in FIG. 3, in the third embodiment of the displacement measuring device 100c of the present invention, an optical module 110' comprises a first lens 114 and a second lens 116. The first lens 114 is located at a first side of the optical module 110', and the second lens 116 is located at a second side of the optical module 110'. When the light source 130 simultaneously generates the first light beam L1 and the second light beam L2, the first light beam L1 is refracted to enter the transparent plate 122 after passing through the first lens 114. When the first light beam L1 reaches the polarizing beam splitting layer 124, the polarizing beam splitting layer 124 allows the first light beam L1 with the first polarization direction to pass through. Thereafter, the first light beam L1 is reflected by a surface of the measured object 10 in order to further sequentially pass through the polarizing beam splitting layer 124, the transparent plate 122 and the second lens 116. On the other hand, the second light beam L2 is refracted to enter the transparent plate 122 after passing through the first lens 114. When the second light beam L2 reaches the polarizing beam splitting layer 124, the polarizing beam splitting layer 124 reflects the second light beam L2 with the second polarization direction. Thereafter, the second light beam L2 is sequentially reflected by the reflective layer 126 and the polarizing beam splitting layer 124 in the transparent plate 122 so as to further pass through the second lens 116. Calculation of the displacement value of the measured object performed by the displacement measuring device 100c is similar to calculation performed by the displacement measuring device 100a. Therefore, no further illustration is provided.

In the third embodiment of the displacement measuring device 100c of the present invention, the optical module 110' comprises the smaller first and second lenses 114, 116 instead of the larger lens 112. Therefore, the size of the displacement measuring device 100c of the present invention can be further reduced. On the other hand, the optical module 110' can also comprise two prisms or two reflectors instead of the first lens 114 and the second lens 116.

Figure 4:
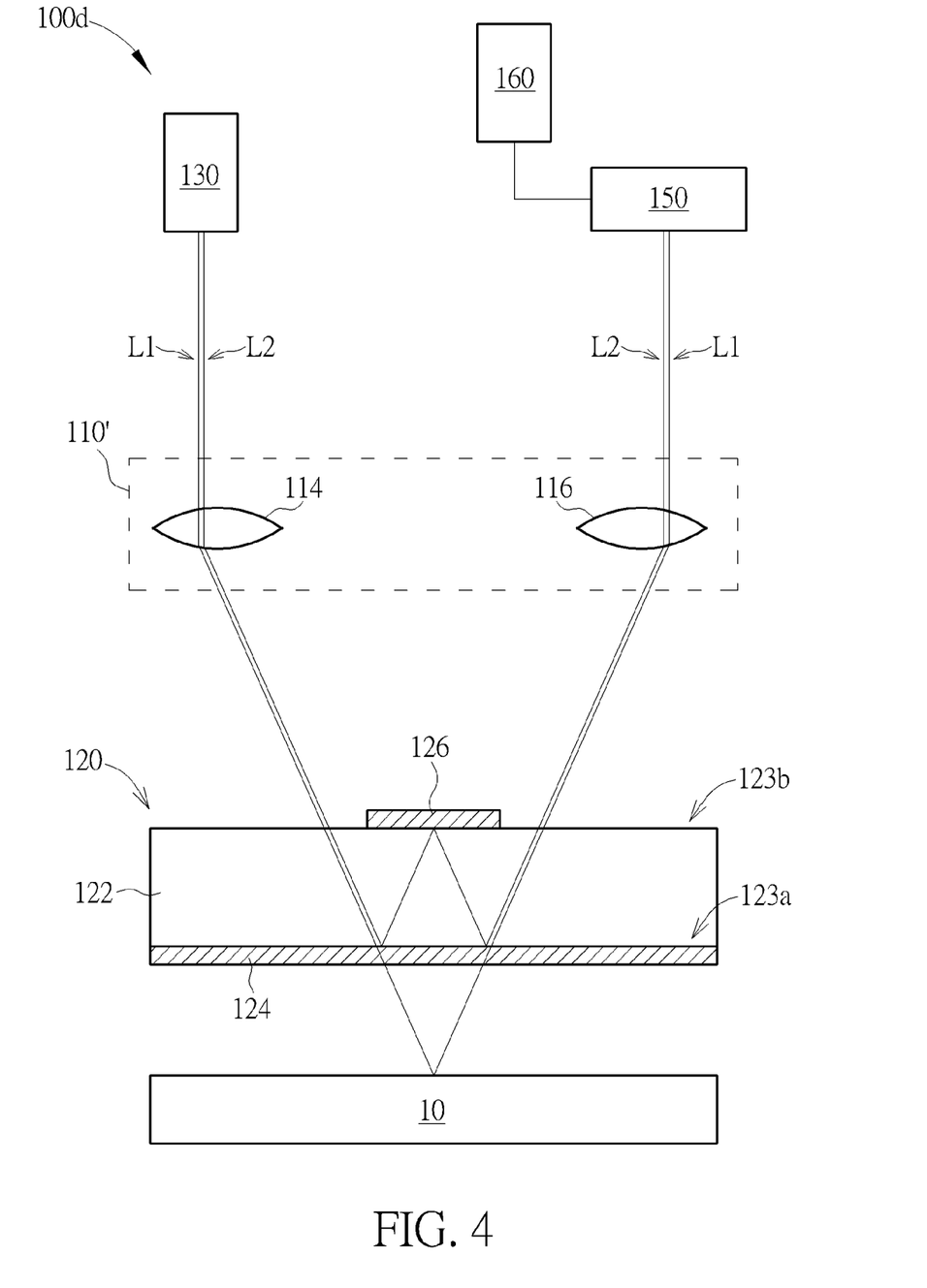
FIG. 4 is a diagram showing a fourth embodiment of the displacement measuring device of the present invention.

Please refer to FIG. 4. FIG. 4 is a diagram showing a fourth embodiment of the displacement measuring device of the present invention. Different from the third embodiment of the displacement measuring device 100c of the present invention, the reflective element is omitted in the fourth embodiment of the displacement measuring device 100d of the present invention. The image sensor can directly receive the first light beam L1 and the second light beam L2 passing through the second lens 116. As such, the structure of the displacement measuring device 100d of the present invention can be further simplified and the size of the displacement measuring device 100d can be further reduced. Operation of the displacement measuring device 100d is similar to that of the displacement measuring device 100c. Therefore, no further illustration is provided.

Figure 5:
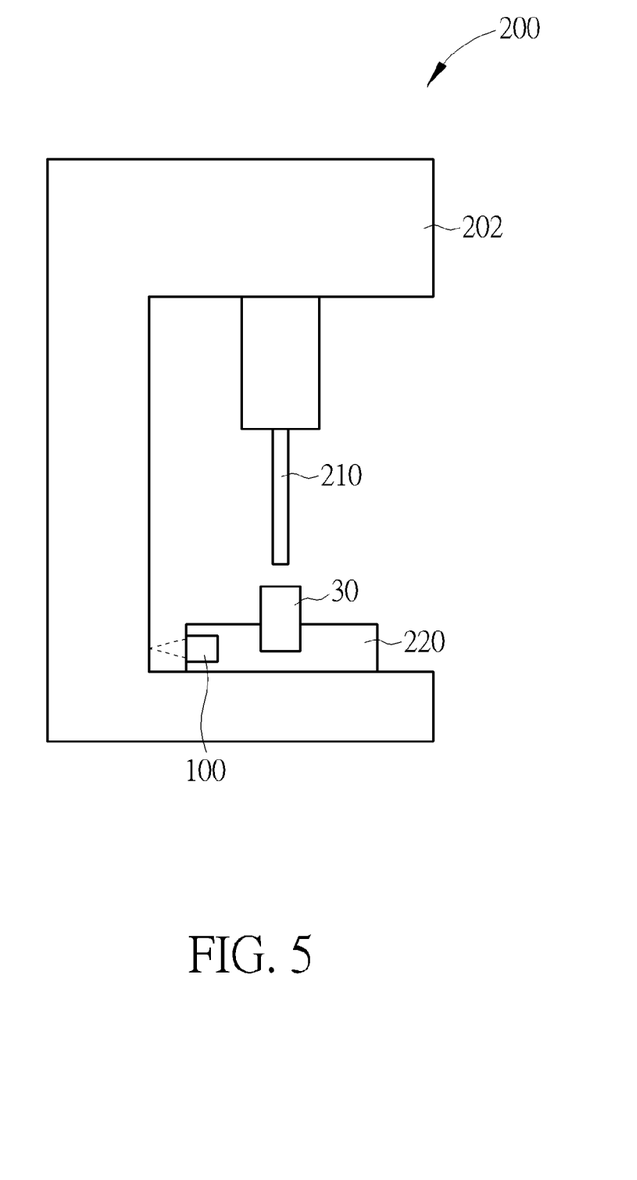
FIG. 5 is a diagram showing a first embodiment of a machining system of the present invention.

The displacement measuring device 100a, 100b, 100c, 100d of the present invention can have a simpler structure and a smaller size. Therefore, the displacement measuring device 100a, 100b, 100c, 100d of the present invention can be easily integrated with a machining device. Please refer to FIG. 5. FIG. 5 is a diagram showing a first embodiment of a machining system of the present invention. As shown in FIG. 5, the machining system 200 of the present invention comprises a base 202, a cutting tool 210, a holding platform 220, and a displacement measuring device 100. The cutting tool 210 is arranged on the base 202 for machining a workpiece 30. The holding platform 220 is movable relative to the base 202 for holding the workpiece 30. The displacement measuring device 100 can be one of the displacement measuring devices 100a, 100b, 100c, 100d shown in FIG. 1 to FIG. 4. The displacement measuring device 100 is arranged on the holding platform 220. The holding platform 220 is electrically connected to the processing unit 160 of the displacement measuring device 100. When the workpiece 30 is machined by the cutting tool 210, the holding platform 220 can be moved according to a displacement value of the holding platform 220 relative to the base 202 obtained by the processing unit 160. Therefore, resolution of movement of the holding platform 220 can be controlled at the sub-micron level or nano level. In other words, the machining system 200 of the present invention can perform sub-micron level or nano level machining on the workpiece 30.

In addition, arrangement of the machining system 200 of the present invention in FIG. 5 is illustrated as an example, the present invention is not limited thereto. In the machining system 200 of the present invention, relative positions between the cutting tool 210, the holding platform 220 and the displacement measuring device 100 can be changed according to design requirements.

Figure 6:
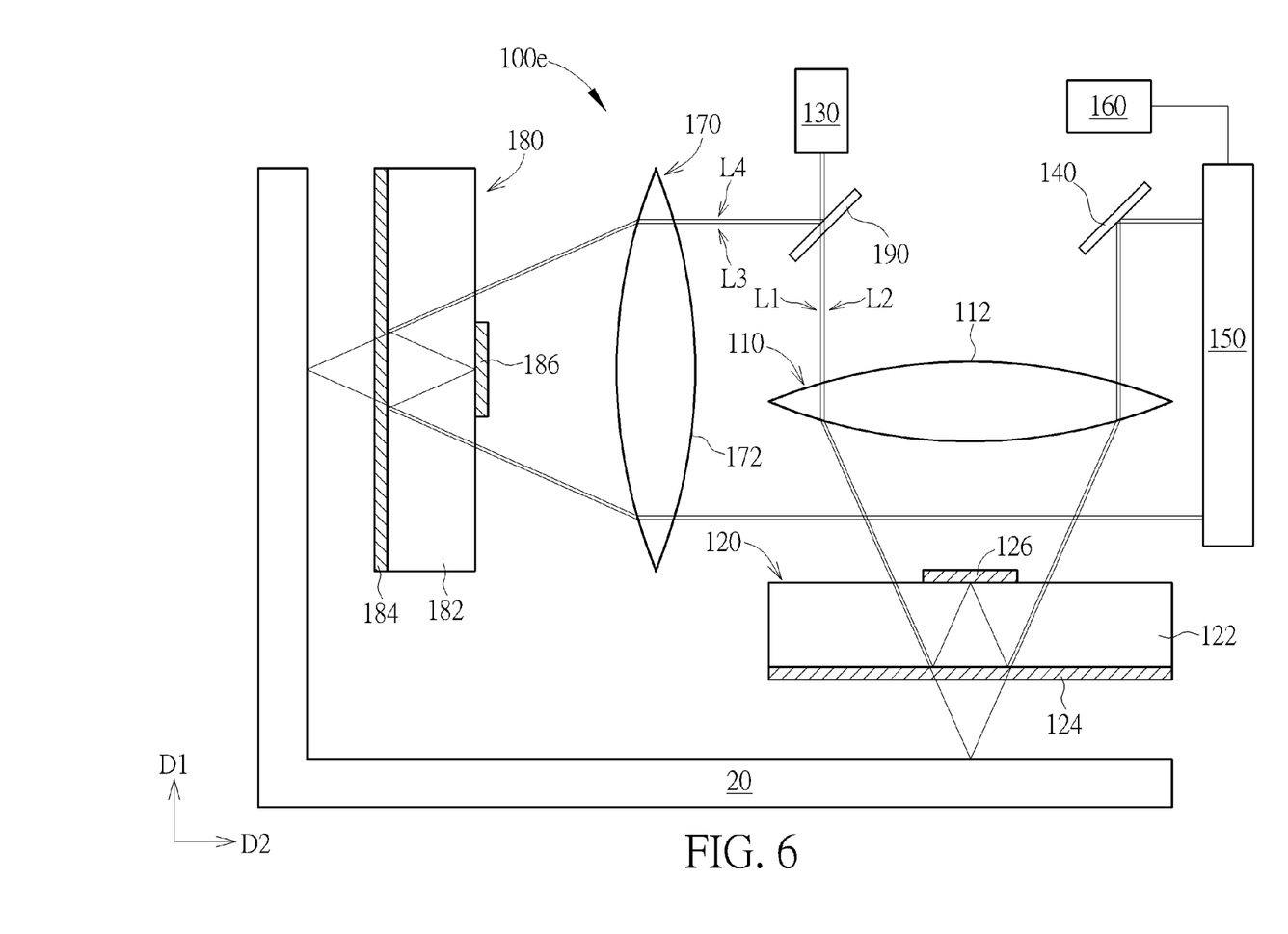
FIG. 6 is a diagram showing a fifth embodiment of the displacement measuring device of the present invention.

Please refer to FIG. 6. FIG. 6 is a diagram showing a fifth embodiment of the displacement measuring device of the present invention. As shown in FIG. 5, the displacement measuring device 100e of the present invention further comprises an optical module 170, a beam splitting module 180 and a beam splitter 190. The optical module 170 comprises a lens 172 for refracting light. The beam splitting module 180 comprises a transparent plate 182, a polarizing beam splitting layer 184 and a reflective layer 186. The beam splitter 190 is configured to split the first light beam L1 and the second light beam L2 in order to generate a third light beam L3 with the first polarization direction and a fourth light beam L4 with the second polarization direction. The third light beam L3 is refracted to enter the transparent plate 182 after passing through a first side of the lens 172. When the third light beam L3 reaches the polarizing beam splitting layer 184, the polarizing beam splitting layer 184 allows the third light beam L3 with the first polarization direction to pass through. Thereafter, the third light beam L3 is reflected by a surface of a measured object 20 in order to further sequentially pass through the polarizing beam splitting layer 184, the transparent plate 182 and a second side of the lens 172. On the other hand, the fourth light beam L4 is refracted to enter the transparent plate 182 after passing through the first side of the lens 172. When the fourth light beam L4 reaches the polarizing beam splitting layer 184, the polarizing beam splitting layer 184 reflects the fourth light beam L4 with the second polarization direction. Thereafter, the fourth light beam L4 is sequentially reflected by the reflective layer 186 and the polarizing beam splitting layer 184 in the transparent plate 182 so as to further pass through the second side of the lens 172. After receiving the third light beam L3 and the fourth light beam L4, the image sensor 150 is configured to sense an interference pattern generated by the third light beam L3 and the fourth light beam L4.

According to the above arrangement, the processing unit 160 can calculate a displacement value of the measured object 20 relative to the displacement measuring device 100e along a first predetermined direction D1 according to the interference pattern generated by the first light beam L1 and the second light beam L2, and calculate a displacement value of the measured object 20 relative to the displacement measuring device 100e along a second predetermined direction D2 according to the interference pattern generated by the third light beam L3 and the fourth light beam L4.

In addition, the displacement measuring device 100e of the present invention can comprise more optical modules, beam splitting modules and beam splitters according to requirements, in order to obtain displacement values of the measured object relative to the displacement measuring device 100e along other directions. Furthermore, the optical module 110, 170 of the displacement measuring device 100e can comprise two lenses, two prisms or two reflectors instead of the lens 112, 172.

Figure 7:
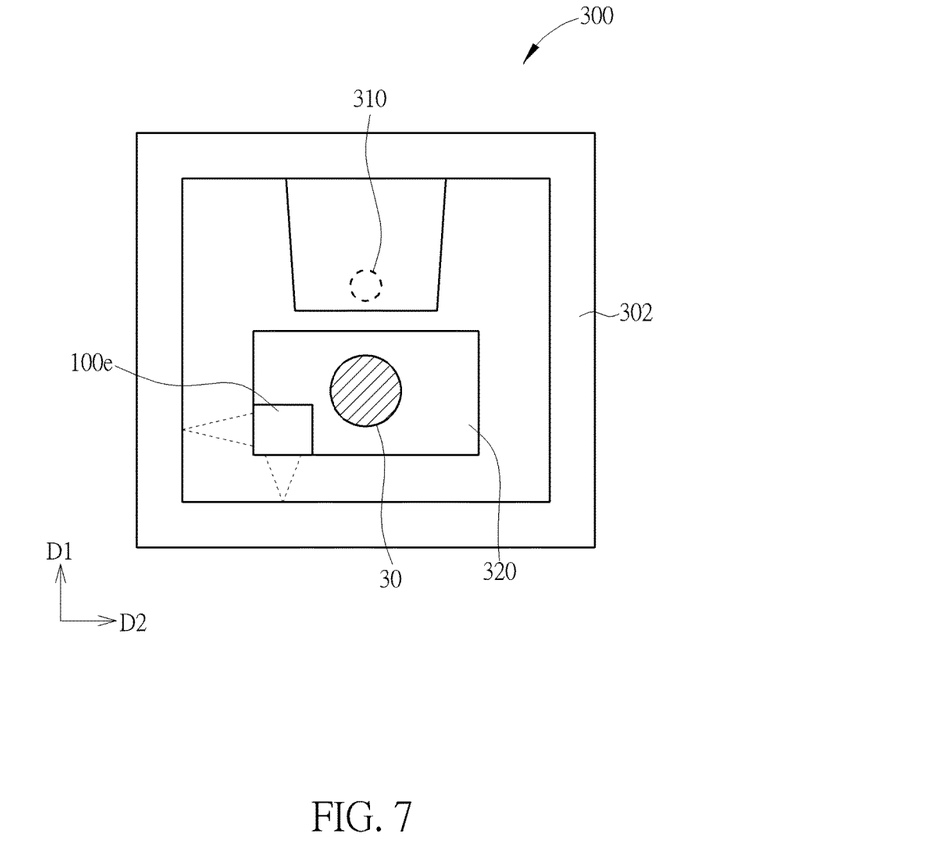
FIG. 7 is a diagram showing a second embodiment of the machining system of the present invention.

Please refer to FIG. 7. FIG. 7 is a diagram showing a second embodiment of the machining system of the present invention. As shown in FIG. 7, the machining system 300 comprises a base 302, a cutting tool 310, a holding platform 320 and a displacement measuring device 100e. The cutting tool 310 is configured to machine a workpiece 30. The holding platform 320 is movable relative to the base 302 for holding the workpiece 30. The displacement measuring device 100e is arranged on the holding platform 320. The displacement measuring device 100e is configured to simultaneously measure displacement values of the holding platform 320 relative to the base 302 along the first predetermined direction D1 (such as Y-axis direction) and the second predetermined direction D2 (such as X-axis direction). The holding platform. 320 is electrically connected to the processing unit 160 of the displacement measuring device 100e. When the workpiece 30 is machined by the cutting tool 310, the holding platform 320 can be moved according to displacement values of the holding platform 320 relative to the base 302 obtained by the processing unit 160. In addition, the displacement measuring device 100e of the machining system 300 of the present invention can comprise more optical modules, beam splitting modules and beam splitters according to requirements, in order to obtain displacement values of the holding platform 320 relative to the base 302 along other directions (such as Z-axis direction).

In contrast to the prior art, the displacement measuring device of the present invention has a simpler structure and a smaller size. Therefore, the displacement measuring device of the present invention can be easily integrated with the machining device, in order to perform sub-micron level or nano level machining on the workpiece. Moreover, the displacement measuring device of the present invention has less beam energy loss. Therefore, the displacement measuring device of the present invention can achieve higher measurement precision.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A displacement measuring device, comprising:
a first optical module configured to refract or reflect light;
a first beam splitting module, comprising:
a first transparent plate having a first surface and a second surface, the first surface being configured to be arranged between the second surface and a first measuring surface of a measured object;
a first polarizing beam splitting layer formed on the first surface for allowing light with a first polarization direction to pass through and reflecting light with a second polarization direction; and
a first reflective layer partially formed on the second surface for reflecting light;
a light source configured to generate a first light beam with the first polarization direction and a second light beam with the second polarization direction, wherein after sequentially passing through a first side of the first optical module, the first transparent plate and the first polarizing beam splitting layer, the first light beam is reflected by the first measuring surface of the measured object in order to further sequentially pass through the first polarizing beam splitting layer, the first transparent plate and a second side of the first optical module; and after passing through the first side of the first optical module, the second light beam enters the first transparent plate and is sequentially reflected by the first polarizing beam splitting layer, the first reflective layer and the first polarizing beam splitting layer in order to further pass through the second side of the first optical module;
an image sensor configured to sense a first interference pattern generated by the first and second light beams passing through the second side of the first optical module; and
a processing unit electrically connected to the image sensor for calculating a displacement value of the measured object relative to the displacement measuring device along a first predetermined direction according to the first interference pattern.

2. The displacement measuring device of claim 1, wherein the first optical module comprises a lens, the first side of the first optical module is a first side of the lens, the second side of the first optical module is a second side of the lens.

3. The displacement measuring device of claim 1, wherein the first optical module comprises a first lens and a second lens, the first lens is located at the first side of the first optical module, the second lens is located at the second side of the first optical module.

4. The displacement measuring device of claim 1, wherein the first optical module comprises a first prism and a second prism, the first prism is located at the first side of the first optical module, the second prism is located at the second side of the first optical module.

5. The displacement measuring device of claim 1, wherein the first optical module comprises a first reflector and a second reflector, the first reflector is located at the first side of the first optical module, the second reflector is located at the second side of the first optical module.

6. The displacement measuring device of claim 1, further comprising:
a reflective element configured to reflect the first and second light beams passing through the second side of the first optical module to the image sensor.

7. The displacement measuring device of claim 1, wherein the first light beam and the second light beam generated by the light source have identical phase and wavelength.

8. The displacement measuring device of claim 1, further comprising:
a second optical module configured to refract or reflect light;
a second beam splitting module, comprising:
a second transparent plate having a first surface and a second surface, the first surface being configured to be arranged between the second surface and a second measuring surface of the measured object;

a second polarizing beam splitting layer formed on the first surface for allowing light with the first polarization direction to pass through and reflecting light with the second polarization direction; and a second reflective layer partially formed on the second surface for reflecting light; and a beam splitter configured to split the first light beam and the second light beam in order to generate a third light beam with the first polarization direction and a fourth light beam with the second polarization direction, wherein after sequentially passing through a first side of the second optical module, the second transparent plate and the second polarizing beam splitting layer, the third light beam is reflected by the second measuring surface of the measured object in order to further sequentially pass through the second polarizing beam splitting layer, the second transparent plate and a second side of the second optical module; and after passing through the first side of the second optical module, the fourth light beam enters the second transparent plate and is sequentially reflected by the second polarizing beam splitting layer, the second reflective layer and the second polarizing beam splitting layer in order to further pass through the second side of the second optical module;

wherein the image sensor is further configured to sense a second interference pattern generated by the third and fourth light beams passing through the second side of the second optical module, the processing unit is further configured to calculate a displacement value of the measured object relative to the displacement measuring device along a second predetermined direction according to the second interference pattern, the second predetermined direction is different from the first predetermined direction.

9. A machining system, comprising:

a base;

a cutting tool arranged on the base for machining a workpiece;

a holding platform movable relative to the base for holding the workpiece; and a displacement measuring device arranged on the holding platform, the displacement measuring device comprising:

a first optical module configured to refract or reflect light;

a first beam splitting module, comprising:

a first transparent plate having a first surface and a second surface, the first surface being configured to be arranged between the second surface and a first measuring surface of the base;

a first polarizing beam splitting layer formed on the first surface for allowing light with a first polarization direction to pass through and reflecting light with a second polarization direction; and a first reflective layer partially formed on the second surface for reflecting light;

a light source configured to generate a first light beam with the first polarization direction and a second light beam with the second polarization direction, wherein after sequentially passing through a first side of the first optical module, the first transparent plate and the first polarizing beam splitting layer, the first light beam is reflected by the first measuring surface of the base in order to further sequentially pass through the first polarizing beam splitting layer, the first transparent plate and a second side of the first optical module; and after passing through the first side of the first optical module, the second light beam enters the first transparent plate and is sequentially reflected by the first polarizing beam splitting layer, the first reflective layer and the first polarizing beam splitting layer in order to further pass through the second side of the first optical module;

an image sensor configured to sense a first interference pattern generated by the first and second light beams passing through the second side of the first optical module; and a processing unit electrically connected to the image sensor for calculating a displacement value of the holding platform relative to the base along a first predetermined direction according to the first interference pattern.

10. The machining system of claim 9, wherein the first optical module comprises a lens, the first side of the first optical module is a first side of the lens, the second side of the first optical module is a second side of the lens.

11. The machining system of claim 9, wherein the first optical module comprises a first lens and a second lens, the first lens is located at the first side of the first optical module, the second lens is located at the second side of the first optical module.

12. The machining system of claim 9, wherein the first optical module comprises a first prism and a second prism, the first prism is located at the first side of the first optical module, the second prism is located at the second side of the first optical module.

13. The machining system of claim 9, wherein the first optical module comprises a first reflector and a second reflector, the first reflector is located at the first side of the first optical module, the second reflector is located at the second side of the first optical module.

14. The machining system of claim 9, wherein the displacement measuring device further comprises:

a reflective element for reflecting the first and second light beams passing through the second side of the first optical module to the image sensor.

15. The machining system of claim 9, wherein the first light beam and the second light beam generated by the light source have identical phase and wavelength.

16. The machining system of claim 9, wherein the holding platform is configured to move relative to the base according to the displacement value calculated by the processing unit.

17. The machining system of claim 9, wherein the displacement measuring device further comprises:

a second optical module configured to refract or reflect light;

a second beam splitting module, comprising:

a second transparent plate having a first surface and a second surface, the first surface being configured to be arranged between the second surface and a second measuring surface of the base;

a second polarizing beam splitting layer formed on the first surface for allowing light with the first polarization direction to pass through and reflecting light with the second polarization direction; and a second reflective layer partially formed on the second surface for reflecting light; and a beam splitter configured to split the first light beam and the second light beam in order to generate a third light beam with the first polarization direction and a fourth light beam with the second polarization direction, wherein after sequentially passing through a first side of the second optical module, the second transparent plate and the second polarizing beam splitting layer, the third light beam is reflected by the second measuring surface of the base in order to further sequentially pass through the second polarizing beam splitting layer, the second transparent plate and a second side of the second optical module; and after passing through the first side of the second optical module, the fourth light beam enters the second transparent plate and is sequentially reflected by the second polarizing beam splitting layer, the second reflective layer and the second polarizing beam splitting layer in order to further pass through the second side of the second optical module;

wherein the image sensor is further configured to sense a second interference pattern generated by the third and fourth light beams passing through the second side of the second optical module, the processing unit is further configured to calculate a displacement value of the holding platform relative to the base along a second predetermined direction according to the second interference pattern, the second predetermined direction is different from the first predetermined direction.

* * * * *

UNITED STATES PATENT AND TRADEMARK OFFICE
CERTIFICATE OF CORRECTION

PATENT NO. : 9,869,540 B1  
APPLICATION NO. : 15/360975  
DATED : January 16, 2018  
INVENTOR(S) : Wei-Hung Su et al.

Page 1 of 1

It is certified that error appears in the above-identified patent and that said Letters Patent is hereby corrected as shown below:

On the Title Page

Item (73), correct the address of the assignee from "Kaosiung (TW)" to --KAOHSIUNG (TW)--.

Signed and Sealed this  
Tenth Day of April, 2018

Andrei Iancu  
*Director of the United States Patent and Trademark Office*